UNITED STATES PATENT OFFICE.

THEODORE HAEGE, OF ROME, ITALY.

PROCESS FOR THE PRODUCTION OF FERTILIZERS CONTAINING PHOSPHORIC ACID AND POTASSIUM.

1,411,696.   Specification of Letters Patent.   Patented Apr. 4, 1922.

No Drawing.   Application filed March 22, 1921. Serial No. 454,421.

*To all whom it may concern:*

Be it known that I, THEODORE HAEGE, a citizen of the German Republic, residing at Rome, in the Kingdom of Italy, have invented certain new and useful Improvements in Processes for the Production of Fertilizers Containing Phosphoric Acid and Potassium, of which the following is a specification.

The present invention relates to a process for the production of fertilizers containing phosphoric acid and potassium.

In late years a number of processes have been proposed for the production of fertilizers containing phosphoric acid and potassium in an assimilable form, but their practical operation offers great difficulties since the temperatures of over 1600° C. even of 2000° C. said by various inventors to be necessary are difficult to attain and the furnaces subjected to such temperatures are quickly destroyed, so that many of the proposed processes cannot be carried out when working continuously. If such processes are carried out in crucible or rotary furnaces the volatilization of potassium and phosphoric acid is a drawback causing considerable losses.

The present invention aims at obviating these drawbacks and combines the knowledge and experience gained from the known processes for the production of a fertilizer containing in an assimilable form, on the one hand, phosphoric acid, lime and silicic acid (calcium-silico-phosphate), and on the other hand phosphoric acid, potassium and silicic acid (alkali-silico-phosphate), by providing a process which enables the production of a fertilizer containing phosphoric acid, potassium, lime together with silicic acid in an assimilable form (potassium-lime-silico-phosphate), which fertilizer is of high nutritive value for cultivated plants and which possesses technically valuable properties as regards preparation, storage, handling and utilization of the products.

According to my invention, the raw materials natural phosphate and leucite or phonolite or potassium felspar or other alkali silicates and limestone or marl or both together, are first broken up to form lumps of egg size, and mixed together in such proportions that on melting, products are obtained, which especially as regards the chemical fixation of the phosphorus are most closely akin to Thomas-slag.

The melting is effected with coke in a blast furnace which is water-cooled near the melting zone, an air blast preferably preheated by the waste gases, and which may be enriched with oxygen being employed. It has been ascertained that the column of the broken up material fed in the furnace acts as a filter and as a chemical binder for the phosphoric acid, and potassium volatilized in the melting zone, so that the content of these substances in the waste gases is very much reduced.

The amount of coke added is such that a temperature at which the melt is thoroughly liquid is obtained in the furnace. The addition of marl instead of lime, required for regulating the composition of the molten products is also of special importance for reducing the melting temperature and for increasing the temperature if desired the addition of technical oxygen to the blast is of particular importance. The melt is periodically or continuously removed from the melting furnace by tapping and running through a trough, and on leaving the trough is disintegrated as finely as possible by a stream of high-pressure steam, air, steam and air, air and water, or water alone, and thrown into a chamber formed by wire-netting which retains the particles of dust but allows the air, steam and gases to pass through. The bottom of the chamber is provided with a conveyor which conveys the disintegrated molten mass to a grinding plant.

The above described disintegration with high pressure steam, air or water effects first an immediate chilling and solidification of the molten product, and thus an increased assimilability of the phosphoric acid, potassium and the like, in the case of a correctly proportioned mixture for the production of a lime-silico-phosphate compound and secondly that hollow spaces and pores are formed throughout the molten product thus assisting grinding, and considerably facilitating the resorption through the roots of the plants.

The disintegration of the liquid melt effected in the above described manner produces a complete decomposition of the calcium sulphide injurious to the plant which may be formed from the calcium sulphate present or from calcium and the sulphur content of the coke, and renders it harmless.

From the waste gases of the blast-furnace after cooling in dust collecting channels or chambers, after settling and filtration, a dust of high phosphorus and potassium content is obtained which may be added to the finished products during or after grinding.

The waste gases of the blast-furnace when not filtered are non-combustible or very difficulty combustible. However, after filtration they may be used for preheating the blast for the blast-furnaces.

Claims—

1. The process of producing a fertilizer, which consists in first breaking up and mixing together phosphates, alkali silicates and lime (marl), then melting this raw material while maintaining the column of the raw material at a height sufficient for the formation of a filter to cause the mechanical and chemical binding of the phosphoric acid and silicate, and finally removing the melt.

2. In the process as specified in claim 1, the further step of disintegrating the melt by means of a blast of high-pressure fluid thereby producing a finely divided product, and at the same time for the purpose of thereby obtaining a nearly complete assimilability of the $P_2O_5$ and $K_2O$.

3. The process of producing a fertilizer which consists in breaking up and mixing together natural phosphates, potassium bearing silicates and marl, melting these substances with the aid of coke and oxygen while maintaining a column of a height sufficient for the formation of a filter to cause the mechanical and chemical binding of the phosphoric acid and potassium silicate, then reducing the melting temperature, removing the melt and finely disintegrating it by a high-pressure fluid and collecting the fine particles.

4. The process as specified in claim 4 in which the fine particles are finally subjected to grinding.

In testimony whereof I have signed my name to this specification in the presence of two subscribing witnesses.

THEODORE HAEGE.

Witnesses:
LETTEN LABO & MOR,
WILHELM SCHMID.